Patented Nov. 6, 1923.

1,473,217

UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing.    Application filed February 24, 1923. Serial No. 621,083.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use. Other objects will hereinafter appear.

In U. S. Patent, No. 1,188,376, Lilienfeld, June 20, 1916, there are disclosed a series of alkyl ethers of cellulose. Certain of these are practically insoluble in water, and my invention relates, but is not limited, to the ethers having that property. While cellulose ethers form very thin solutions in the propionic acid esters of the lower monohydroxy aliphatic alcohols, such single solvents by themselves do not dissolve enough of the ethers to make dopes having the requisite strength and viscosity for the manufacture of film base by customary methods or for use in the other plastic arts.

I have discovered, however, that the propionates of the lower monohydroxy aliphatic alcohols have latent solvent powers for cellulose ethers which may be brought out by using suitable common solvents, such as the lower monohydroxy aliphatic alcohols. By the latter expression I mean those having less than 6 carbon atoms.

While the ingredients may be mixed in widely varying proportions, it is noted by way of example, that particularly useful compositions can be prepared by mixing equal parts by weight of the alkyl propionate with the common solvent. Thus in the preferred form of my invention I dissolve 1 part by weight of the cellulose ether, say water-insoluble ethyl cellulose, in from 5 to 7 parts by weight of a solvent mixture comprising equal parts of methyl or ethyl propionate and methyl alcohol. The ingredients by themselves are not sufficiently powerful to make properly flowable solutions of this strength. Of course, the proportion of mixed solvent or the proportion of the volatile ingredients, such as methyl alcohol, may be increased to adapt the composition to the lacquering art, as will be understood by persons skilled therein.

Other substances which impart additional suppleness, or incombustibility, or other qualities, to the film may also be added to the dope, such, for instance, as triphenyl or tricresyl phosphate, monochlornaphthalene, camphor, etc. The ingredients are of the ordinary commercial type and sufficiently purified for the process of film manufacture, so as to give a dope yielding film having the proper relative freedom from color. The viscous-flowable dope above described can be used in connection with the usual film-forming apparatus without the necessity of expensive alterations in the latter.

In the formation of a film by the spreading and drying of the compositions hereinabove described, a considerable amount of the alkyl propionate, such as methyl or ethyl propionate, remains behind, because of the relatively low volability of these compounds. They impart useful plastifying and other properties to the film, which is normally flexible and transparent. Since the ratio of the weight of alkyl propionate to the weight of cellulose ether can be made much greater by the use of my mixed solvent instead of using the propionate alone as a solvent, it follows that a correspondingly greater proportion of alkyl propionate will be present in the finished film.

Having thus described my invention, what I claim as new and desire to secure by Letters Patent is:

1. A composition of matter comprising cellulose ether dissolved in a mixture of a propionic acid ester of a lower monohydroxy aliphatic alcohol and a common solvent which brings out the latent solvent power of the ester.

2. A composition of matter comprising cellulose ether dissolved in a mixture of methyl alcohol and ethyl propionate.

3. A flowable composition comprising 1 part of cellulose ether dissolved in from 5 to 7 parts by weight of a mixture of a lower monohydroxy aliphatic alcohol and a propionic acid ester of a lower monohydroxy aliphatic alcohol.

4. A composition of matter comprising cellulose ether dissolved in a mixture of substantially equal parts by weight of a propionic acid ester of a lower monohydroxy aliphatic alcohol and a common solvent which brings out the latent solvent power of the ester.

5. A composition of matter comprising 1 part by weight of water-insoluble ethyl cellulose, 7 parts of ethyl propionate and 7 parts of methlyl alcohol.

6. As an article of manufacture, a deposited, transparent, flexible film comprising cellulose ether and a propionate of a lower monohydroxy aliphatic alcohol, the proportion of said propionate being greater than the maximum proportion depositable in a transparent film from a solution of said cellulose ether in said propionate alone.

Signed at Rochester, New York this 16 day of February 1923.

JOHN M. DONOHUE.